United States Patent [19]
Li

[11] Patent Number: 6,141,055
[45] Date of Patent: Oct. 31, 2000

[54] METHOD AND APPARATUS FOR REDUCING VIDEO DATA MEMORY IN CONVERTING VGA SIGNALS TO TV SIGNALS

[75] Inventor: Xiao Chuan Li, Cupertino, Calif.

[73] Assignee: Aitech Int'l Corporation, Fremont, Calif.

[21] Appl. No.: 08/890,941

[22] Filed: Jul. 10, 1997

[51] Int. Cl.[7] ........................................... H04N 7/01
[52] U.S. Cl. ................................ 348/446; 348/718
[58] Field of Search ........................... 348/446, 441, 348/458, 714, 715, 716, 718, 719; 345/507, 509, 515

[56] References Cited

U.S. PATENT DOCUMENTS

| | | | |
|---|---|---|---|
| 5,170,351 | 12/1992 | Levy | 348/446 |
| 5,430,488 | 7/1995 | Hedley | 348/446 |
| 5,959,680 | 9/1999 | Bril | 348/446 |
| 6,028,589 | 2/2000 | Mehra et al. | 348/446 |

*Primary Examiner*—Victor R. Kostak
*Attorney, Agent, or Firm*—Joe Zheng

[57] ABSTRACT

It is disclosed herein that a system for reducing video data memory in VGA-to-TV converters that convert computer video signals to TV compliant signals for display on regular TV screens. By closely tracking two pointers, one being a write pointer responsible for writing incoming video data into the video data memory and the other being a read pointer responsible for reading out the stored video data in the video data memory, the memory is efficiently used for buffering the video data. To ensure that the read pointer always retrieves the valid video data at its own speed, an address monitoring process is provided to monitor the address difference between the write pointer and the read pointer. When the monitoring process detects that the read pointer may soon surpass the write pointer, a control process is placed on the write pointer to prevent the read pointer from passing over the write pointer. Depending on the speed difference between the write and read pointers, the writer pointer is either paused for a frame time or assigned to a secondary write pointer that writes data into the memory just visited by the read pointer. The efficient use of the memory makes it possible to reduce the memory capacity to a minimum so as to reduce the cost of manufacturing the converters.

43 Claims, 11 Drawing Sheets

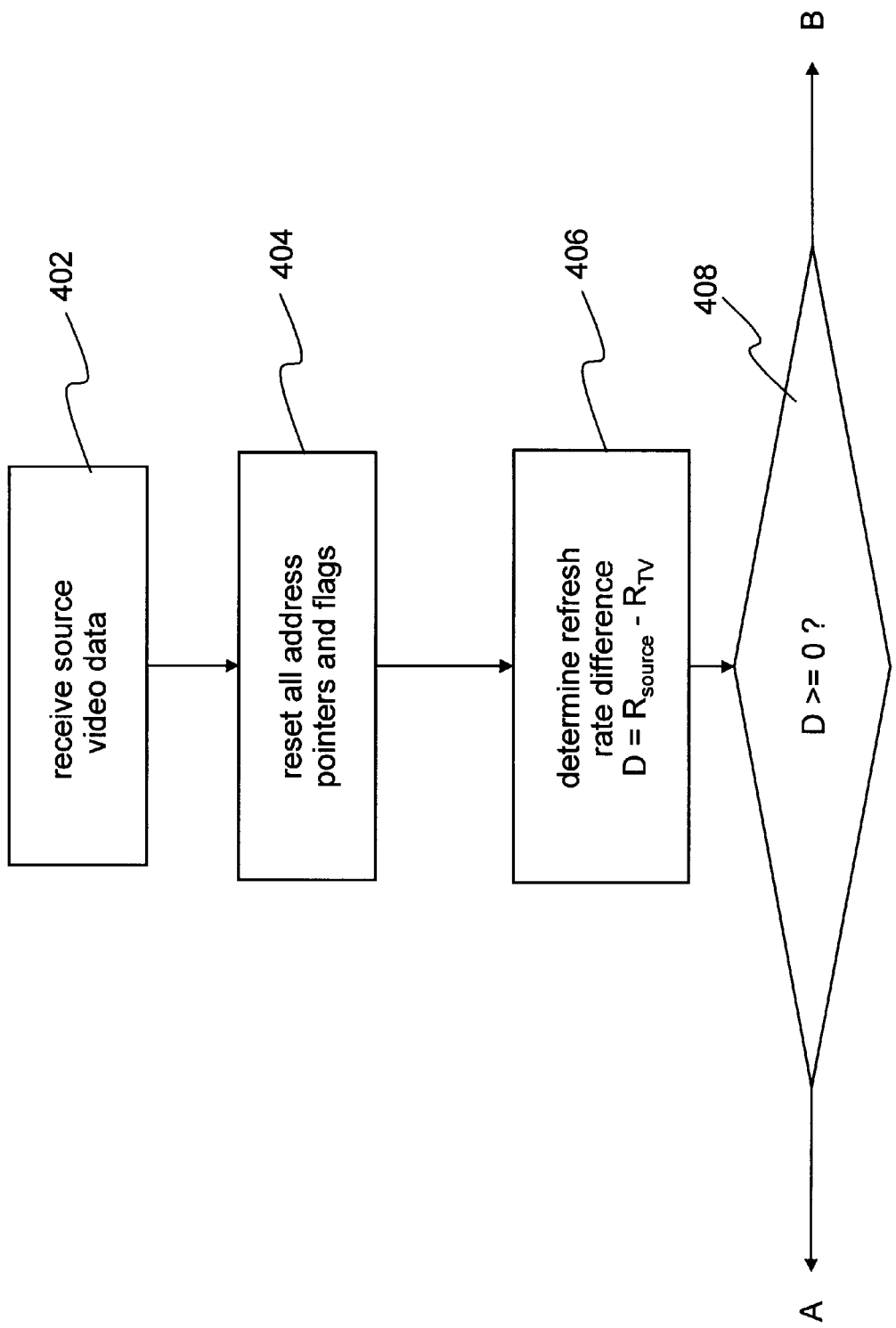
Fig. 4.a

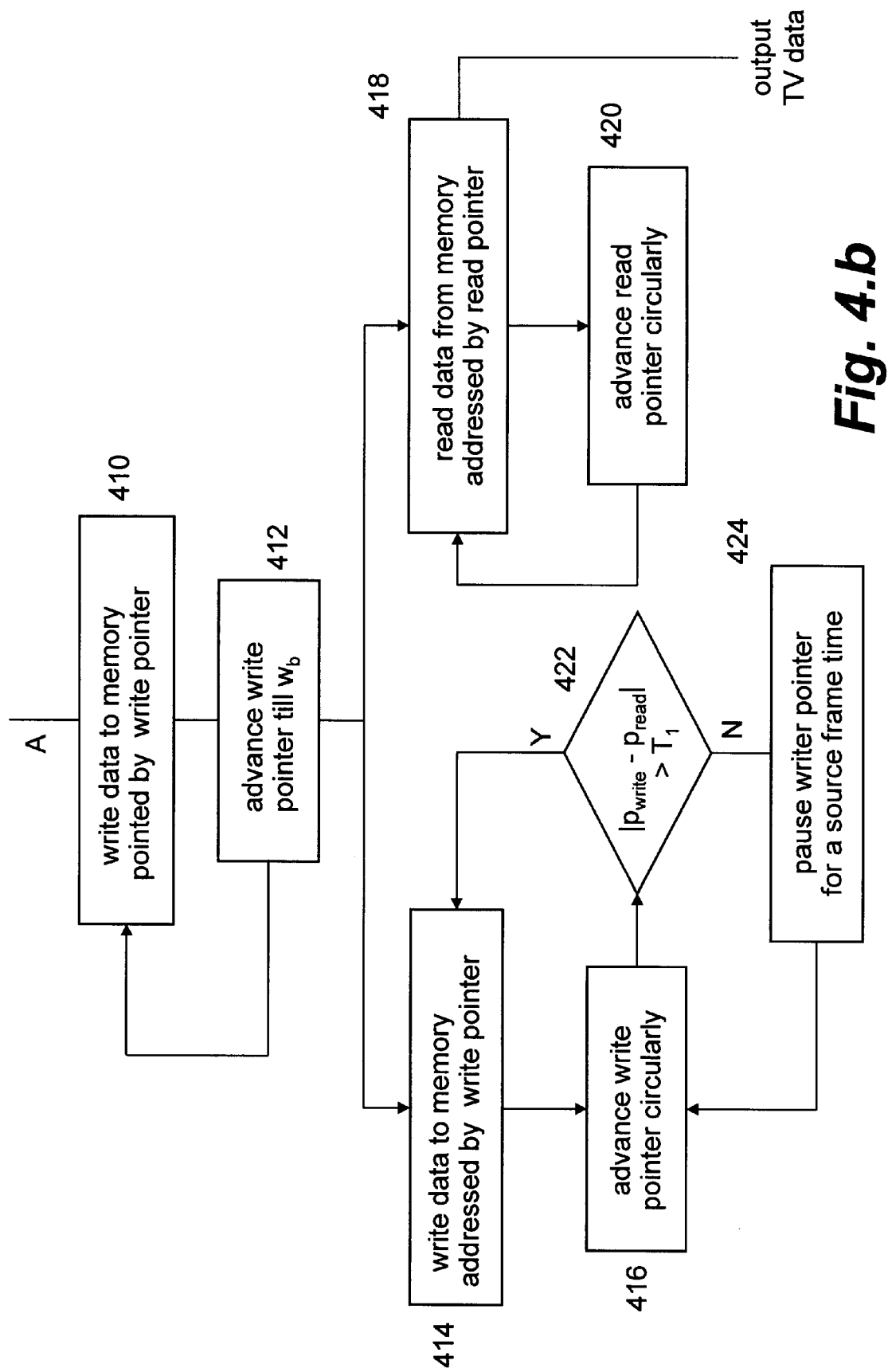
Fig. 4.b

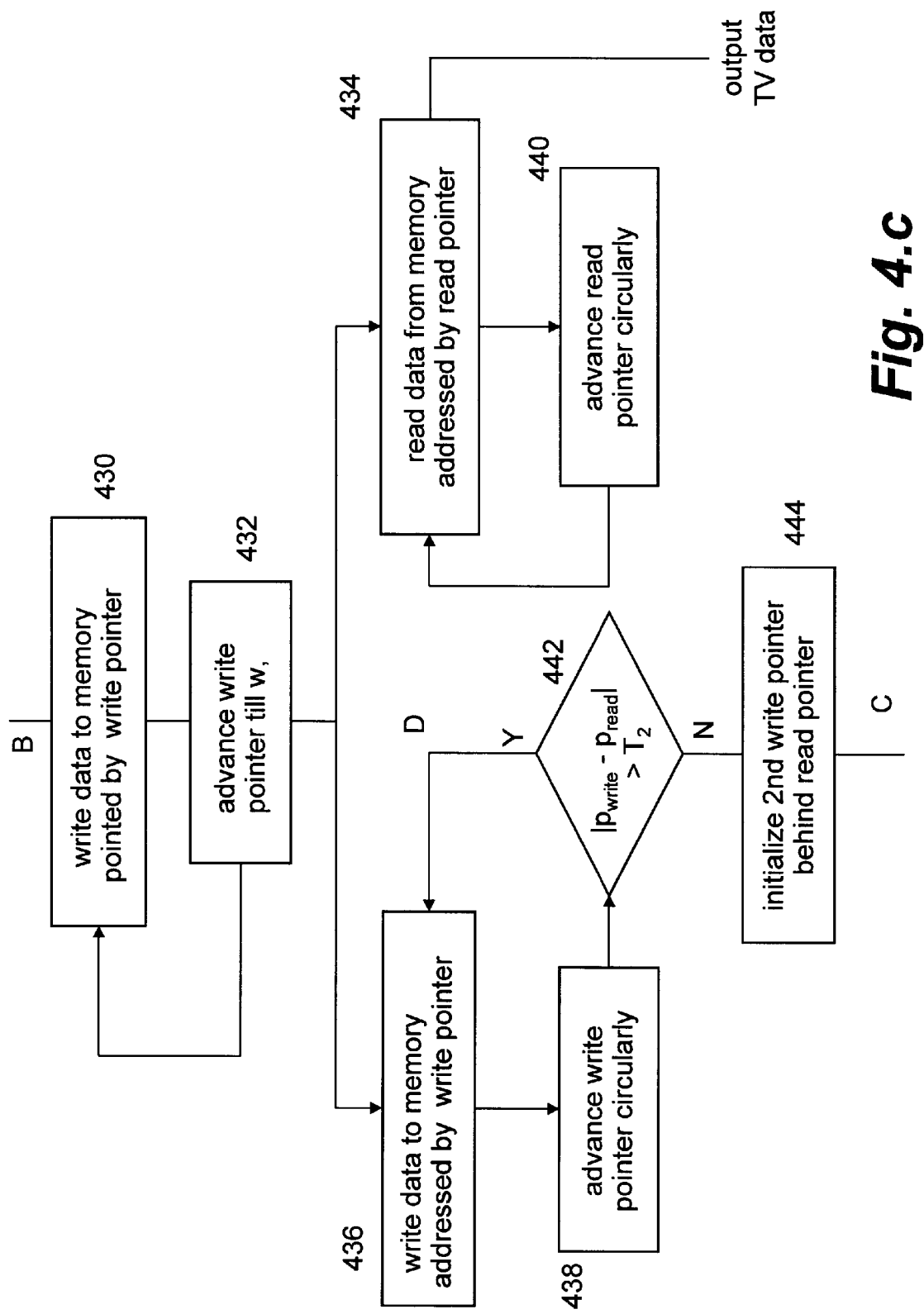
Fig. 4.c

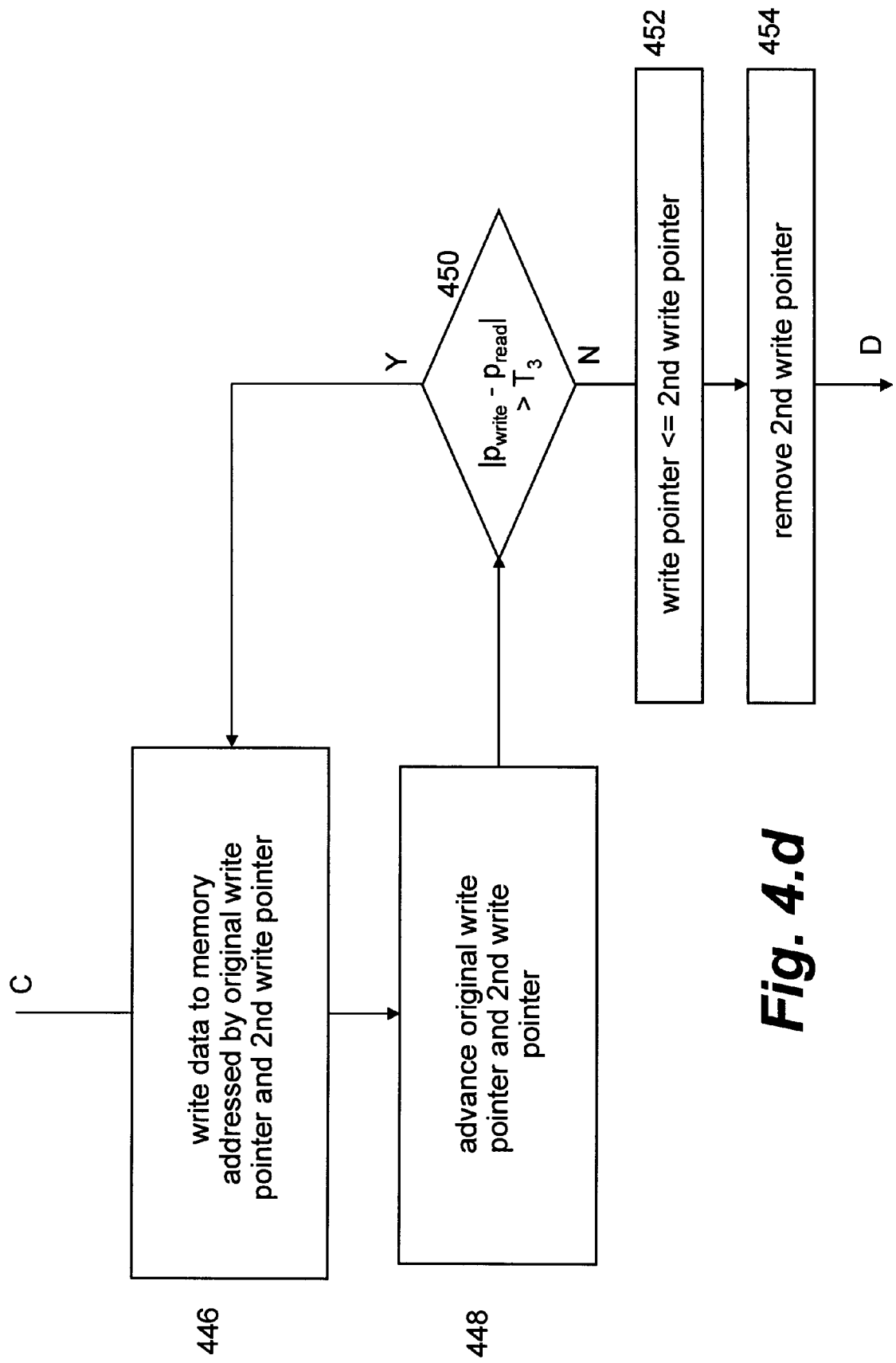
Fig. 4.d

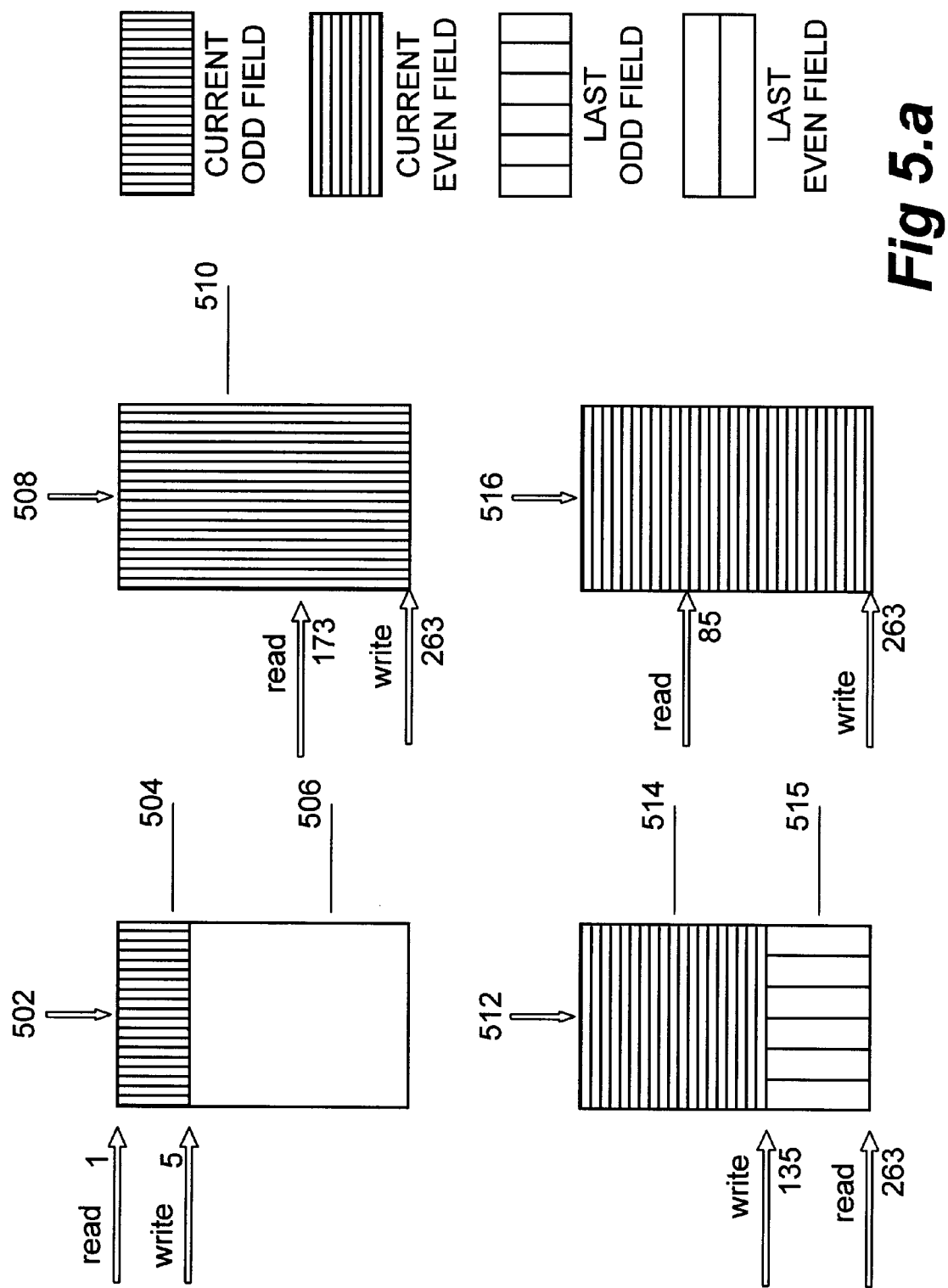

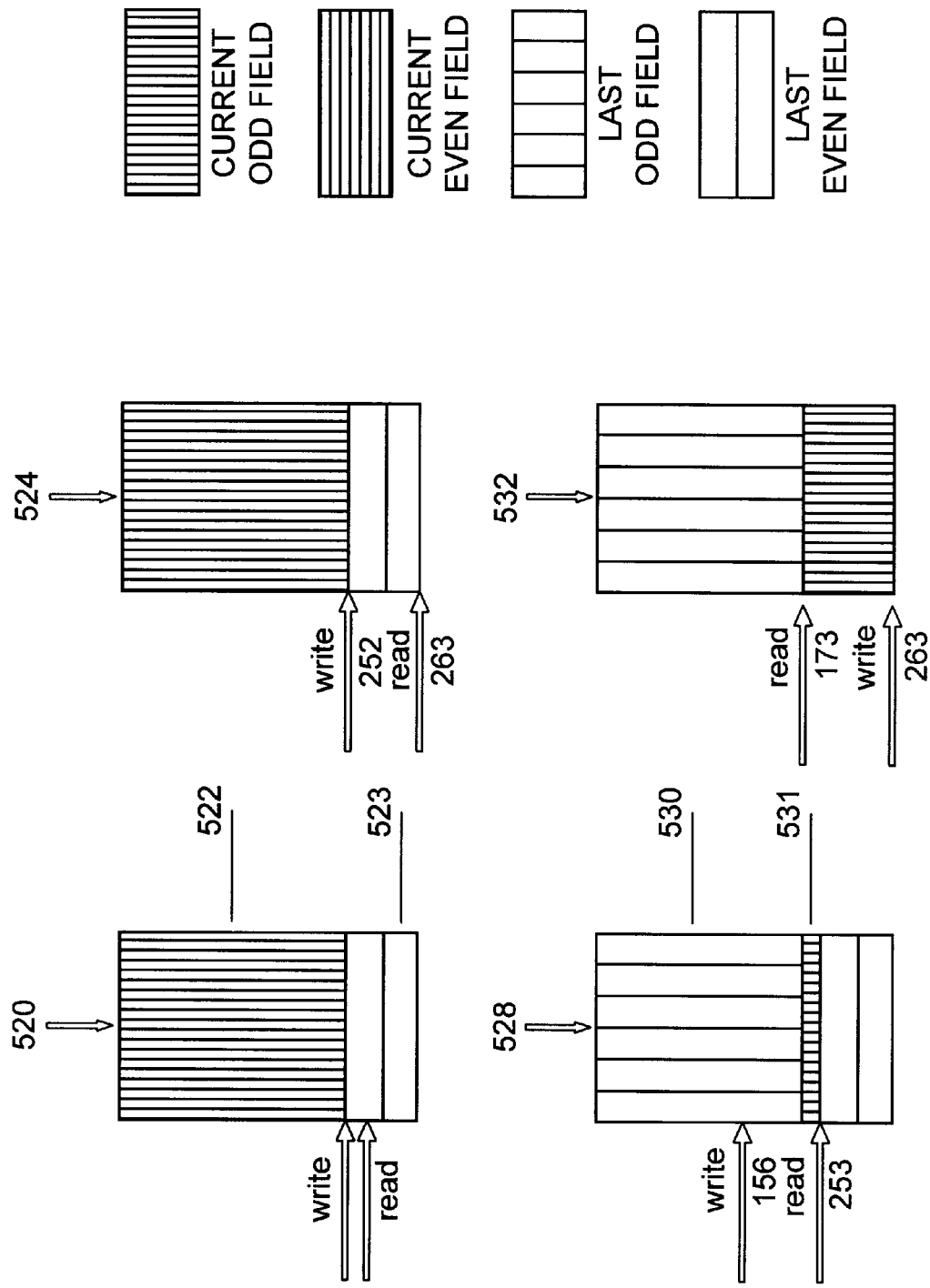
Fig 5.b

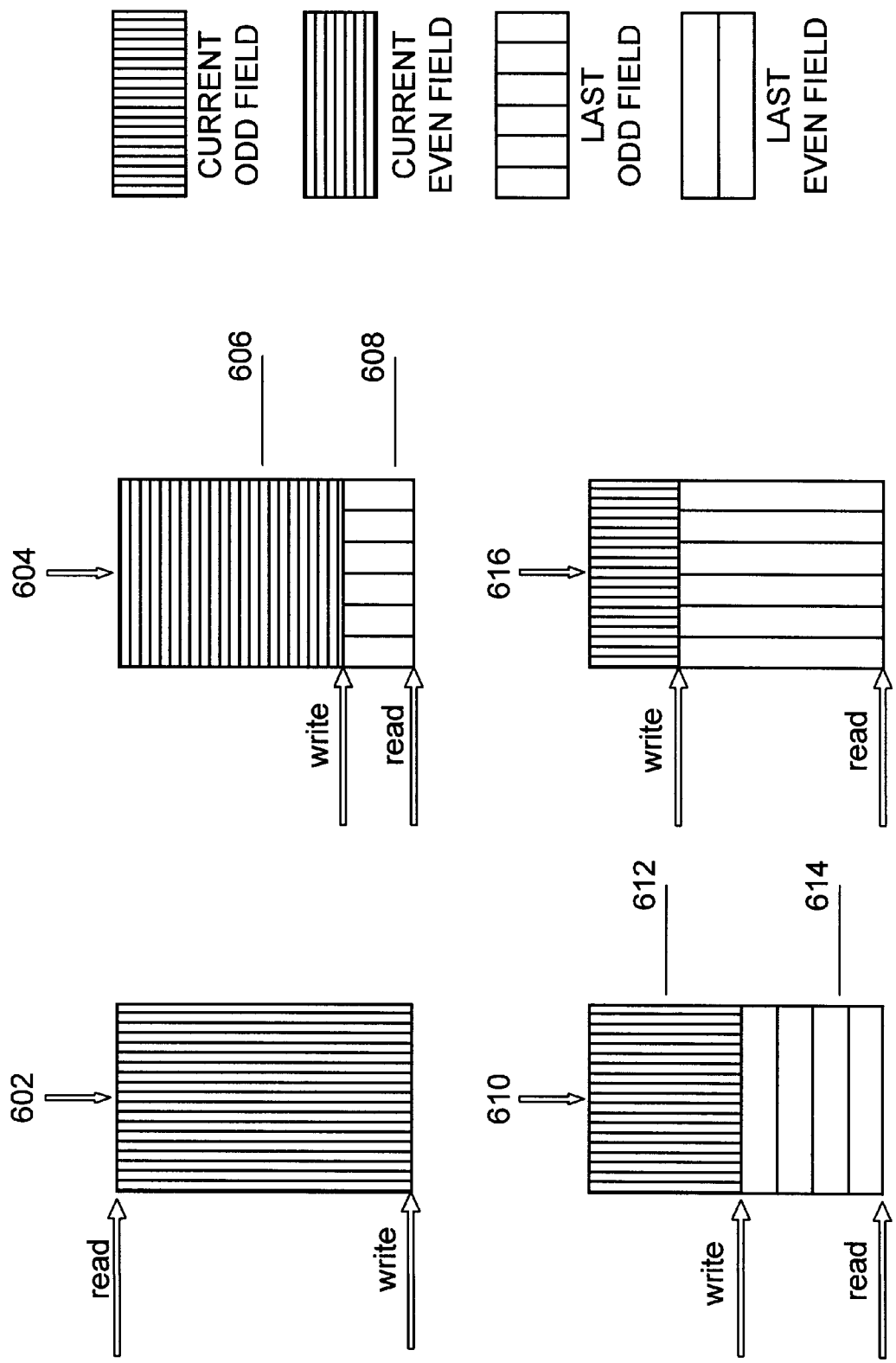
Fig 6.a

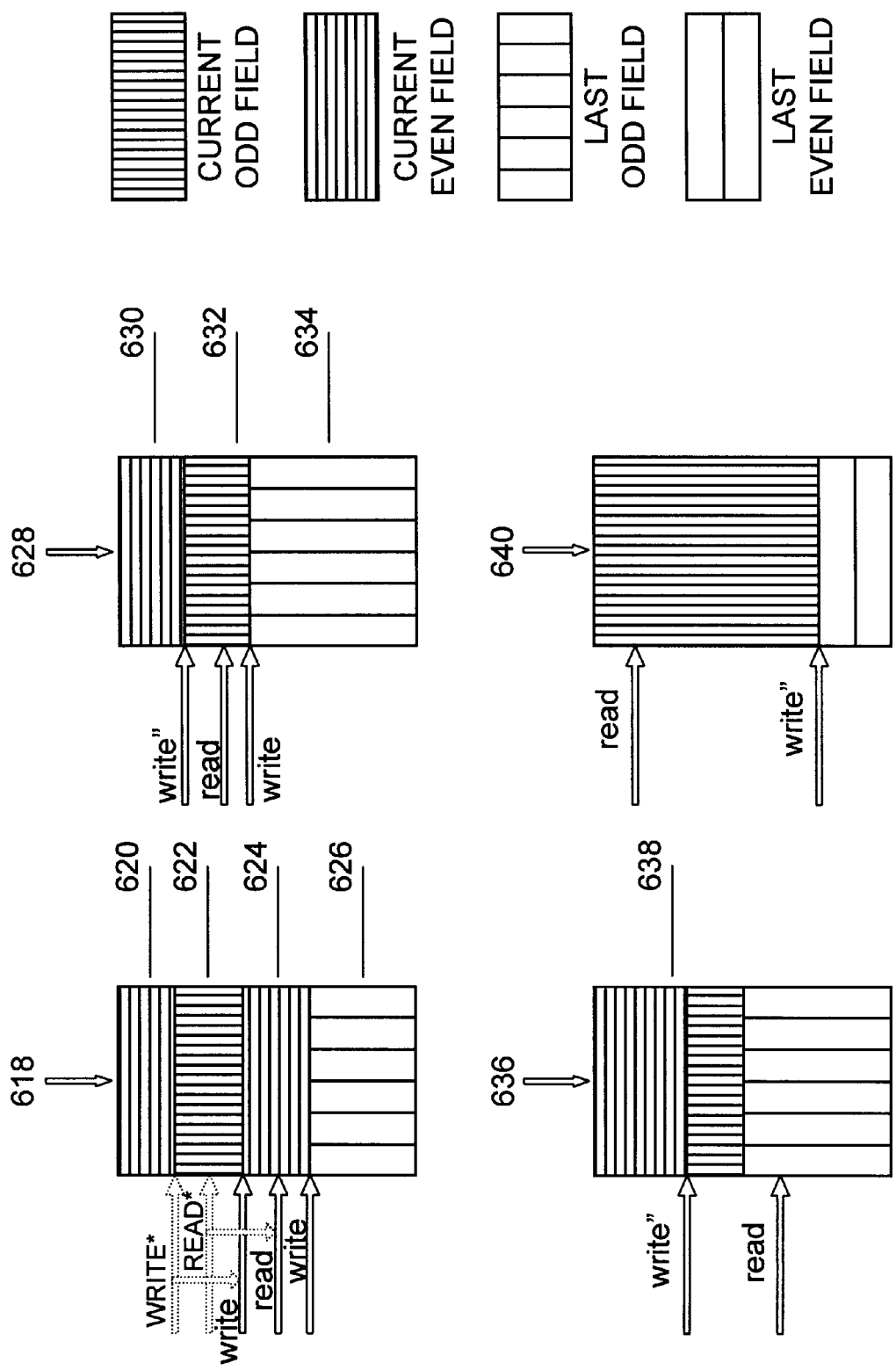
Fig 6.b

METHOD AND APPARATUS FOR REDUCING VIDEO DATA MEMORY IN CONVERTING VGA SIGNALS TO TV SIGNALS

FIELD OF INVENTION

The present invention relates to video signal conversions and more particularly to improved methods and apparatuses for reducing memories in signal converters that convert digitally from non-interlaced video data with a first video refresh rate to interlaced video data with a second video refresh rate, wherein the first video refresh rate and the second video refresh rate are not necessarily the same.

DESCRIPTION OF THE RELATED ART

There are many applications that desire to display computer video signals from computers onto larger, more advantageous and more pleasant regular television (TV) screens, for example, on-line presentation, computer simulations or games, and web browsing. However nearly all computers in use today output a standard non-interlaced digital video format, such as 640 by 480 VGA signals, applicable to all computer monitors while many TV sets in use today expect to receive analog interlaced video format, such as NTSC system in North America and Japan and PAL system in many Asian and European countries. A signal conversion from the standard non-interlaced video signals from computers to the interlaced video signals must be carried out before computer image signals can be displayed on a regular TV screen. The same conversion is required in emerging digital video disc players (DVD) in which digital video data in the disc are retrieved and converted to interlaced data for display on regular TV screens.

The non-interlaced format tends to scan a screen progressively, namely one line after another, to form a complete image frame while the interlaced format completes an image frame by scanning even lines first followed by scanning odd lines. The two different formats generally result in two different refresh rates. The refresh rate herein refers to the speed at which a screen repaints or refreshes. The horizontal scan rate, often expressed in kilohertz (kHz), is the speed a line can paint horizontally in one second. A higher horizontal scan rate allows a monitor to run at higher resolutions with acceptable refresh rates. The vertical scan rate, also referred to frame refresh rate, expressed in Hertz (Hz), indicates how many times the screen repaints, from the top most line to the bottom line, per second. Generally the higher the vertical refresh rate is, the less screen flicker a user would notice, hence, the less eyestrain the user would endure. The horizontal and vertical scan rates combine to provide the ability to produce high resolution images. Currently the frame refresh rate of larger computer monitor displays is often set to at least 56 Hz and often 75 Hz or 85 Hz to minimize screen flickers effectively.

A 640 by 480 VGA screen has 640 pixels or dots across a line and 480 lines down. The higher the number of the pixels, hence the resolution, the more information the monitor can display thereon. In reality, many images are computer-generated at much higher resolution than the size of 640 by 480 pixels, the images are preferably displayed in monitors capable of displaying larger images, such as 1024 by 768. Presently, the maximum supported resolution is 1800 by 1440, greatly improved from the NTSC color TV resolution of 320 by 525 pixels. Yet the computer signals have to be processed to the format of 320 by 525 pixels to be shown on a regular TV screen.

Generally, a separate circuitry is used to receive and change the computer video signals to TV signal by converting the line refresh rate and, in most cases, the frame refresh rate to corresponding TV refresh rate, often resulting in less resolution images for display on a TV screen. This requires the analogue RGB signals or composite Y/C signals from the video card to be re-sampled in a video signal processing circuitry to reduce the line resolution and further buffered in a video data memory to finally produce video data with appropriate TV video refresh rates. According to VESA standards, there are a number of standardized computer video modes, many of them do not have a simple relation to NTSC or PAL TV format standards. So lines of computer video signals may have to be resampled and the number of lines in a frame may have to be altered by vertical scaling. After the rate conversion and scaling, encoding into baseband video signals is straightforward, and is usually included in the same unit. U.S. Pat. No. 4,924,315 to Yamashita discloses such signal converting circuitry.

It is general understood that such video signal converters or circuitry comprise a video data memory which is used to alter the video frame refresh rate and the memory used therein is often the most expensive item among other components. Further such video data buffer or memory has to be sufficiently large enough to accommodate all possible computer video modes, this results in the design of the video data memory towards the accommodation of the highest frame refresh rate, hence the use of a lot of memory. In addition, the higher image resolution a signal converter can receive, the more memory it has to have therein to buffer corresponding video data for TV display. As a common choice and for the performance, a number of DIVAB 422 memory, from Signetics/Philips Semiconductors in Sunnyvale, Calif. 94088, are often used and the prices thereof and auxiliary circuitry may go upward very fast as the capacity of the memory increases. Therefore, there has been a great need of a methodology to reduce the usage of the memory in the video data memory so as to reduce the cost of manufacturing video signal converters and the like.

SUMMARY OF THE INVENTION

The present invention has been made in consideration of the above described problems. In a preferred embodiment, the present invention is a system for reducing video data memory in signal converters that convert non-interlaced VGA signals to interlaced TV signals. Thus, in one aspect, the invention provides a generic solution to reducing the video data memory to a minimal number by tracking closely and independently two separate addresses of a write pointer and a read pointer and further controlling the write pointer to ensure that the read pointer always access valid data stored by the write pointer in the memory.

In the preferred embodiment, the invention comprises means for controlling the write and read pointers and a memory for buffering incoming non-interlaced video data with a first refresh rate to interlaced video date with a second refresh rate, both the first and second refresh rates are not necessarily the same. The incoming non-interlaced video data comprises a plurality of lines, each comprising a plurality of pixels. The memory comprises a plurality of line cells, each of the line cells comprising a plurality of pixel cell for storing the individual pixels of the incoming video data. The incoming video data is written, one line at a time, into the line cell pointed by the write pointer at the speed of the first refresh rate. The stored data in the line cells of the memory is read out by the read pointer at the speed of the second refresh rate. To ensure that the read pointer always follows the write pointer so as to read out valid data, a pointer monitoring process is added to monitor the address difference between the write pointer and the read pointer. In the case that the first refresh rate is faster than the second refresh rate, the pointer monitoring process sends a control signal to a control circuitry that control the write pointer if the process detects that the write pointer may surpass the read pointer. Upon receiving the control signal, the control circuitry pause the write pointer for one frame time of the first refresh rate so that the address difference between the write pointer and the read pointer becomes widened. In the case that the first refresh rate is slower than the second refresh rate, instead of pausing the write pointer, the control circuitry initializes a second write pointer right behind the read pointer. The second write pointer writes lines of data, preferably from alternative lines of the incoming data, into the memory. The second write pointer is assigned to be the original write pointer when the address difference between the original write pointer and the read pointer less than a predefined threshold, so that the read pointer would never surpass the write pointer. By closely tracking the positions of the write and read pointers, the line cells of the memory are efficiently reused so as to cut down the memory capacity.

Accordingly, an important object of the present invention is to provide a generic solution to reducing video data memory in signal converters that convert non-interlaced VGA signals to interlaced TV signals so as to reduce the cost of manufacturing such converters and further to provide a scheme of using effectively the memory by closely tracking both the write and read pointers in buffering non-interlaced video data to interlaced video data;

Other objects, together with the forgoing are attained in the exercise of the invention in the following description and resulting in the embodiment illustrated in the accompanying drawings.

BRIEF DESCRIPTION OF THE DRAWINGS

FIG. 4 illustrates the operational flow diagram of the disclosed system according to a preferred embodiment thereof;

FIG. 5 shows a set of graphical representation of the video memory of FIG. 3 for the case that the computer video refresh rate is faster than that of a TV format; and FIG. 6 shows a set of graphical representation of the video memory of FIG. 3 for the case that the computer video refresh rate is slower than that of a TV format.

PREFERRED EMBODIMENT—DESCRIPTION

The present invention discloses a system for reducing video data memory in video signal converters that convert computer video signals to TV video signals for display on conventional TV screens. The video signals are primarily from a video card in a computer system for display on a computer monitor. The video card is no different from commercially available video cards for personal computers, such as Stealth64 Graphics Accelerator 2001 Series by Diamond Multimedia Systems, Inc. located at 2880 Junction Avenue in San Jose, Calif. 95134. It will be understood to those skilled in the art that the system to be described in the sequel can be applied to other signal converting circuitry that receives and converts non-interlaced video signals from other sources as well, such as digital video discs and network video broadcasting, to interlaced video signals with a TV compliant frame refresh rate.

Figure 1:
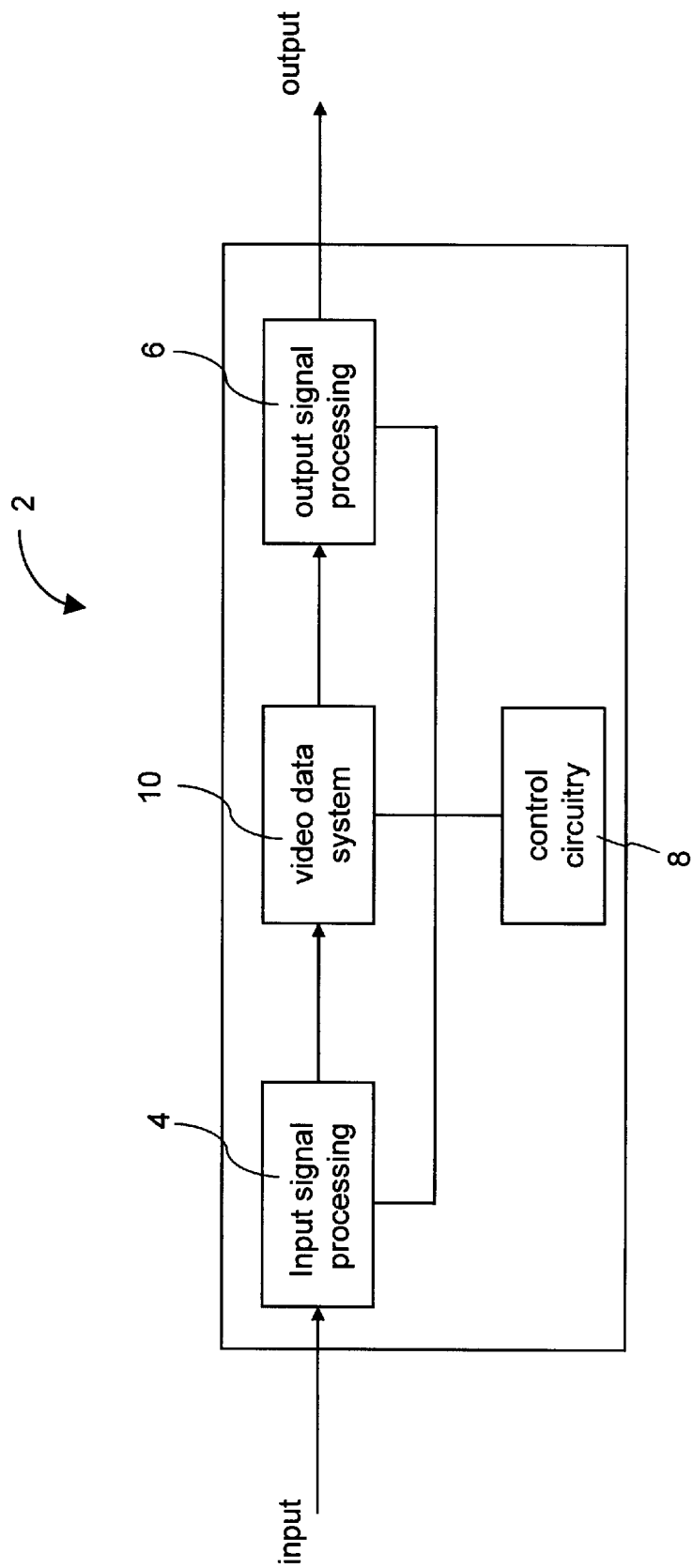
FIG. 1 depicts a configuration of the disclosed video data memory system in communication with its auxiliary circuitry in a video signal converter.
Figure 2:
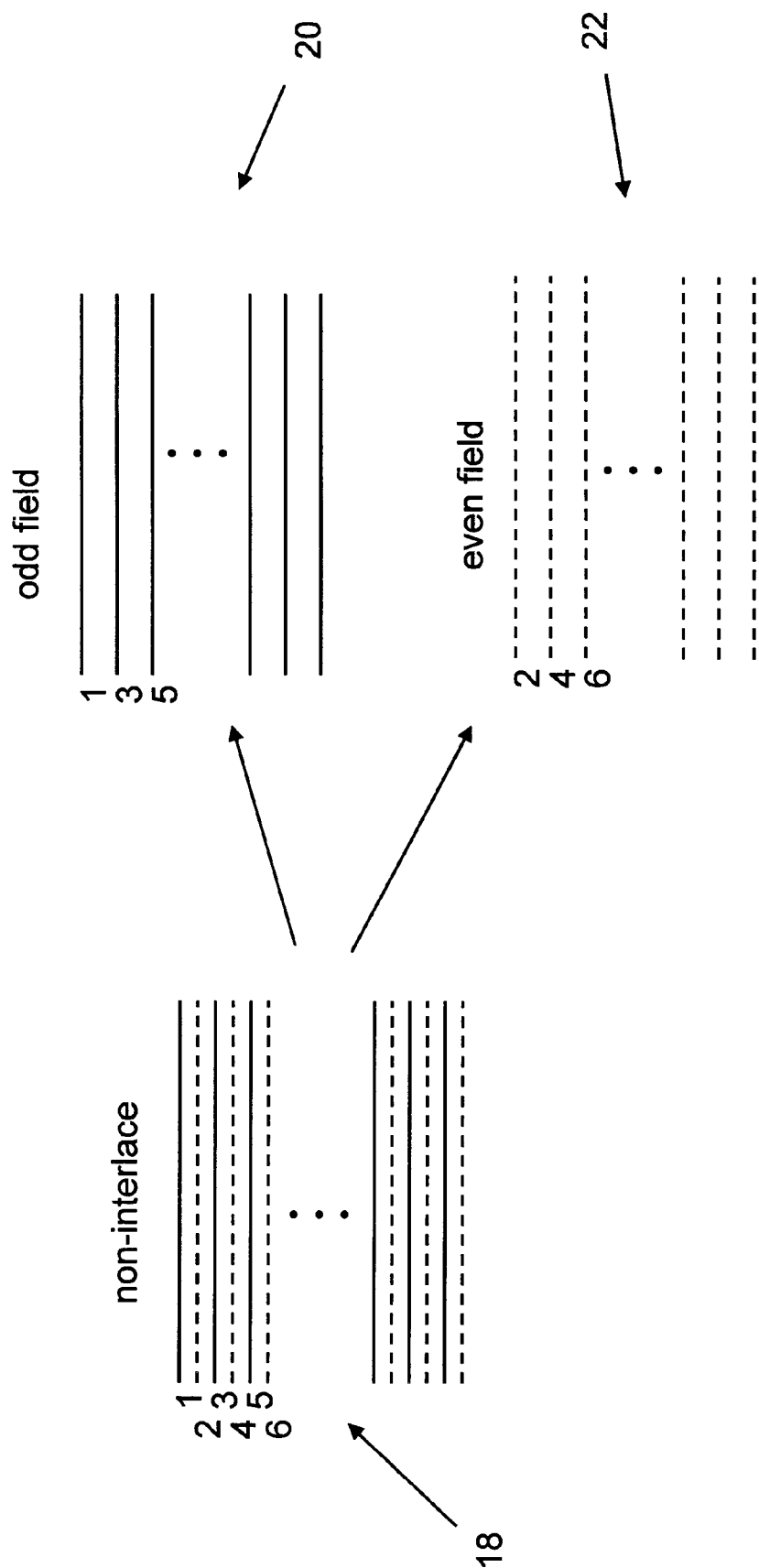
FIG. 2 shows a graphical representation of a non-interlaced video signal comprising one field being converted to an interlaced video signal comprising two fields, the even field and the odd field, the non-interlaced signal represents an input to the disclosed invention in FIG. 1 and the interlaced signal represents the output thereof.

Referring now to the drawings, in which like numerals refer to like parts throughout the several views. FIG. 1 depicts a configuration of the disclosed system 10 in a VGA-to-TV signal converter 2. VGA or VGA signals are referred to herein as computer video signals that can be applied directly to regular computer monitors for display. TV signals are generally referred to as the signals readily applicable to regular TVs for display. A digital format of the VGA signals or the TV signals is referred to herein as data or signals interchangeably. The VGA-to-TV signal converter 2 comprises an input signal processing circuitry 4, an output signal processing circuitry 6, a control circuitry 8 and the present invention 10, alternatively referred to as video data system. The input signal processing circuitry 4 receives VGA signals generally from a video card in a computer and processes the signals therein to output video data for transforming into TV video data in the video data system 10. The processing functions, known to those skilled in the art, comprise filtering, gain adjustment, analog-to-digital conversion (ADC), signal interlacing and others. It shall be understood that the input signal processing circuitry 4 is not part of the disclosed invention, but outputs a format that is expected by the disclosed system 10. The format will be clearly described when FIG. 2 is explained. The output signal processing circuitry 6 receives the TV video data from the video data system 10 and further processes the signal therein to generate TV signals in NTSC, PAL or other standard format applicable to TV for display. The processing functions in the output signal processing circuitry 6, again known to those skilled in the art, comprises signal encoding, digital-to-analog conversion (DAC) and etc. The control circuitry 8, often timed with the sync signals in the incoming video signals, provides system clock signals to all the circuits in the converter 20 to operate cooperatively, including memory address signals provided to the video data system 10 to access memory cells therein and all sync signals needed in the output signal processing circuitry 6 for final composite TV signals. The implementation of the control circuitry 8 is known to those skilled in the art and many logic circuits commercially available are meant to generate various timing signals that can be used to control the operations of all circuits in a converter.

Referring now to FIG. 2, there shows a graphical representation of non-interlaced video data and the corresponding interlaced data that the disclosed system receives and outputs, respectively. As referenced by 18, the non-interlaced video data comprise a sequence of lines of signals, for example, 480 lines for a VGA signal. Each of the lines is represented by a number of pixels such as 640 pixels. In other words, the non-interlaced video data can be viewed as a representation of an array of pixels, each pixel is a light energy intensity or intensity level. A graphics or an image is therefore represented by varying the pixel intensities, for example, a cluster of pixels being zero values is a representation of a black patch or a sequence of pixels being 255 is a representation of a white trace or line provided the representation is in 8-bit range. A frame of non-interlaced data consists of two fields of data, each having a half frame of the whole frame non-interlaced data, or more precisely, one having all the even lines, referenced by 20, and the other having all the odd lines, referenced by 22, of the non-interlaced data. Although the non-interlaced video data 18 has the same number of pixels in a line and the same number of lines as the combined interlaced data 20 and 22 have, after being processed in the input signal processing circuitry 6 in the FIG. 1, each of the frame refresh rates can be different. For example, if the original VGA video signals are displayed at 60 Hz, the frame refresh rate thereof is the same as that of the NTSC TV signals, the non-interlaced video data would be applied directly to the output signal processing circuitry 6 in FIG. 1. If the original VGA video signals are displayed other than 60 Hz, the non-interlaced data resulting from the original VGA signals must be processed by the disclosed system for synchronizing the refresh rate to that of the TV signals. As stated above, many VGA signals, regardless of the image dimensions, are displayed at different refresh rates, commonly 56 Hz, 60 Hz, 72 Hz, 75 Hz and even 85 Hz per Video Electronics Standards Association (VESA) Standards and Guidelines. That means a VGA image of 640 by 480 pixels can be displayed at frame refresh rate 60 Hz for normal display or 85 Hz for better visual effects. A complete standard and guideline can be obtained from VESA located at 2150 North First Street, Suite 440, San Jose, Calif. 95131. Therefore a video data memory has to be provided to buffer the computer video data for conforming to corresponding TV video data.

Figure 3:
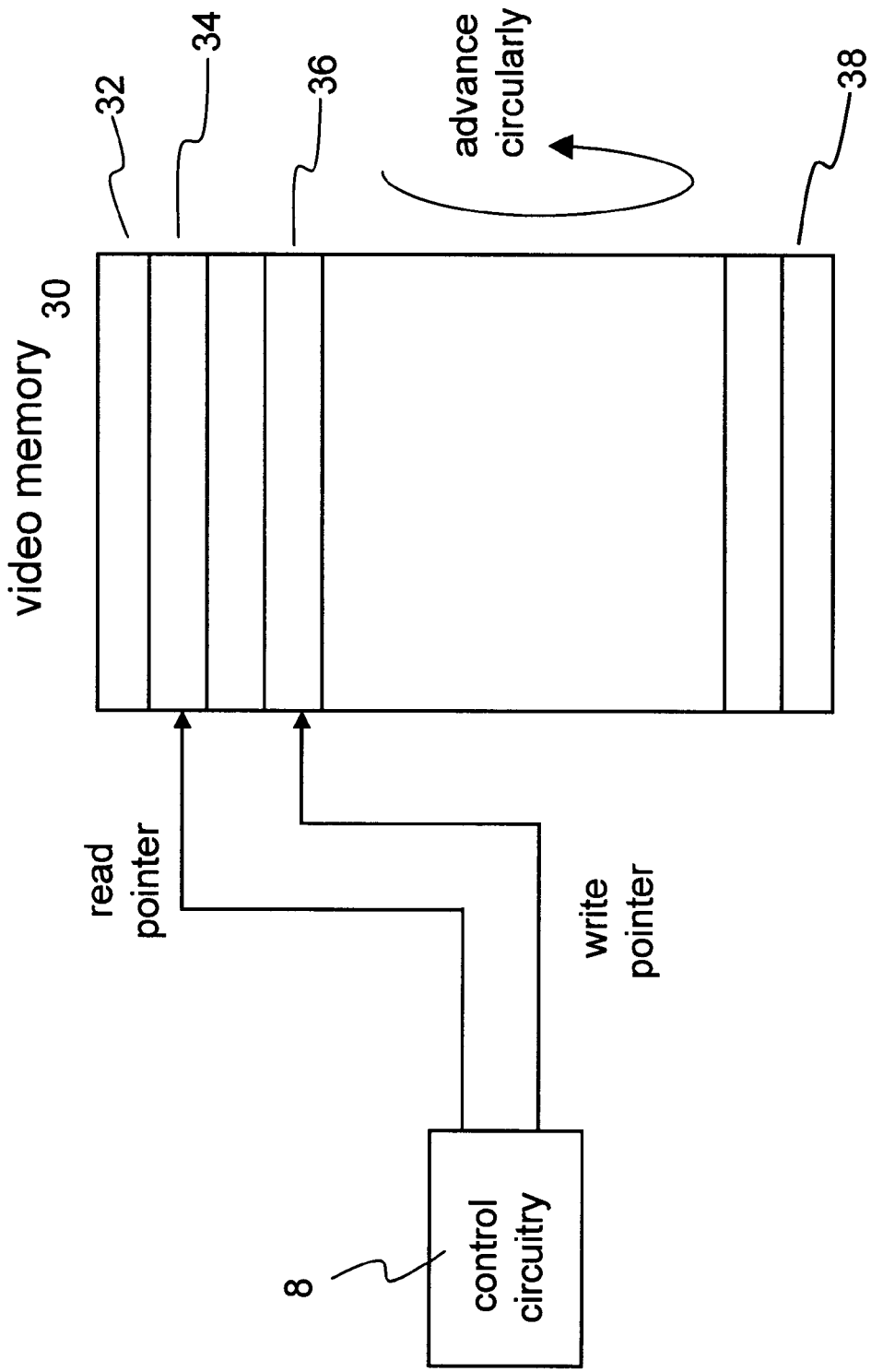
FIG. 3 demonstrates graphically a video memory with a pair of accessing pointers, the write and read pointers, used in a preferred embodiment of the disclosed system.

Many VGA-to-TV signal converters have a manual switch switchable to a desired TV format, for example NTSC or PAL, or simply the converters are designed for a TV format in a specific marketplace. The TV refresh rate $R_{TARGET}$ is therefore a known parameter when VGA signals are being converted to TV signals. For the non-interlaced video data 18 to be properly displayed on TV, the refresh rate thereof has to be synchronized with the refresh rate of the TV video data 20 and 22. That means a non-interlaced video data comprising both odd and even fields, regardless of its original refresh rate, has to be conformed to a TV standard and displayed at 60 Hz if it is NTSC TV standard. FIG. 3 illustrates graphically a video data system comprising an array of memory cells 30. The memory is represented therein in form of the video data shown in FIG. 2, comprising a plurality of lines, each of the lines, referring to as line cells, comprising a plurality of cells, each for holding one pixel. Therefore a line of video data or pixels can be stored in one line of the memory cells, for example, referenced by 32, 34, 36 or 38. To simplify the description, it is assumed that the memory 30 is accessed on a line base. A whole line of memory cells is accessed by one address or an addressing pointer. In other words, a line of video data is written into a line of memory cells or retrieved therefrom based on the address or addressing pointer. The assumption, however, does not change the fact that the memory 30 is in reality accessed cell by cell, every cell has an address and must be accessed individually. Because the video data system herein is used to synchronize the frame refresh rate, accessing to cells in a line has no impact on the frame refresh rate. The memory 30 can be made with μPD488170L DRAM from NEC Electronics Inc. having a business address of 475 Ellies Street, Mountain View, Calif. 94043.

FIG. 3, it is illustrated that a line cell 34 is being pointed by a read pointer and another line cell 36 is being pointed by a write pointer. Therefore, it is simple to state that the memory 30 comprises a plurality of line cells, each being addressed by an address or addressing pointer. For example, the first line cell 32 has an address 0x0000, provided 32 bit addressing and expressed in hex format. The second line cell 34 and the forth line cell 36 will have an address 0x0100 and 0x0200 respectively, wherein it is assumed that a line cell comprises 256 individual cells. All addresses are generated by the control circuitry 8. It must be pointed out that address for the write pointer and address for the read pointer are independently generated and controlled. To be more precisely, the position of the write pointer is controlled in synchronization with the refresh rate of the computer video data or source video data and the position of the read pointer is controlled in synchronization with the refresh rate of the TV compliant video data or target video data. To write a sequence of data into the line cell 34, the location of the line cell 34 is pointed by the write pointer. The sequence of data is thus stored into the line cell 34. To read a sequence of data from a line cell, for example line cell 36, the location of the line cell 36 is pointed by a read pointer and the data stored in the cells of the line 36 are then read out therefrom. When a line of video data is read out from a line cell, the line cell becomes immediately available for new data to write in. To utilize all the line cells efficiently so as to cut down the cost of the memory 30, both write pointer and read pointer are moved circularly, namely a pointer advances downward from line cell 32 to line cell 38 and moves back to line cell 32 to continue downward advancement according to FIG. 3.

Referring now to FIG. 4, there is depicted a block diagram of a preferred embodiment of the disclosed system with reference to corresponding processing devices. To fully understand the block diagram, FIGS. 3, 5 and 6 shall be referenced in conjunction with FIG. 4. As shown, non-interlaced data 18, i.e. the source data that have already been converted from a VGA signal, are received sequentially in block 402. In response to the incoming source video data, a read pointer and a write pointer in block 404 must be initialized, namely both pointers point to a line cell in the video memory, preferably the very first line cell 32 of the memory 30 in FIG. 3. In block 406, a difference D between the frame refresh rate $R_{source}$ of the incoming video data and the refresh rate $R_{target}$ of the final target format is calculated. From the refresh rate difference D, it can be determined which refresh rate is larger numerically. For example if $R_{source}$ is 75 Hz and $R_{target}$ is 60 Hz, then D=75−60=15, which is greater than zero, or $R_{source}$ is 55 Hz and $R_{target}$ is 60 Hz, then D=55−60=−5, which is less than zero. The difference D, therefore, leads to two cases.

First Cases D≧0

The first case is that $R_{source}$ is equal to or greater than $R_{target}$. To ensure that read pointer always points to a line cell that holds valid source video data, it is preferable to let the write pointer advance for a few lines. In blocks 410 and 412, the write pointer points to one line cell and a sequence of video data is written therein, then the write pointer advances to the next line cell and a second sequence of video data is written therein. After the write pointer reaches $W_b$, say $W_b$=5, namely fifth line cell, the read pointer starts to activate, reading data from the line cell that has been accessed by the write pointer. In other words, the disclosed system starts to send out synchronized video data, i.e. the target video data, in block 418 while the write pointer continues to advance at the pace of the source refresh rate $R_{source}$ as shown in blocks 414 and 416. Similarly the read pointer advances at the pace of the target refresh rate $R_{target}$ in blocks 418 and 420. FIG. 5 illustrates graphically corresponding contents in the memory, respectively, with respect to the positions of the write and read pointers and each of the contents in the memory can be viewed as a memory status at an instantaneous moment. Referenced by 502, the memory has a few lines of cells being filled with data from the odd lines of the source video data and the read pointer is still initialized at the first line cell of the memory and the write pointer points to the fifth line cell. It is understood to those skilled in the art that the 9th line of the source data is actually being written into the 5th line cell of the memory 502 as the source data is in non-interlaced format and the data are always read from the odd lines first, referring to the odd field data, and followed by the data read from the even lines, referring to as the even field data. The top memory portion referenced by 504 indicates that valid odd field data has been stored therein and the lower memory portion referenced by 506 is still available. As soon as the write pointer advances to the next line cell, the read pointer activates and one line of data is retrieved from the line cell pointed by the read pointer which, similar to the write pointer, but advances at the pace of the target refresh rate to the next line cell that holds valid odd field data. Because D>0, indicating the source refresh rate is faster than the target refresh rate and further the write and read pointers are advanced independently, soon the address difference between the write pointer and the read pointer increases. If the memory size is assumed to hold exactly the complete odd field data, all odd field data will have been written into the memory when the write pointer first reaches the last line cell of the memory as referenced by 508 in FIG. 5 wherein the reader pointer has advanced quite far from its originally initialized position but before the end of the memory. It shall be understood that odd field data in the line cells behind the read pointer have been read out and are no longer useful and the line cells referenced by 510 become the new areas for continuing writing source video data, or more precisely, writing the even field data. To be more specific with the positions of the write and read pointers for a certain D value, it makes simpler to assume that:

$$\frac{R_{source}}{R_{target}} \equiv 1.5$$

which means that $R_{source}$ is 1,5 times faster than $R_{target}$ and the target video format has two fields with a total number of 525 lines. Based on the exemplary value, the last line cell of the memory 508 must be 263rd line cell which holds the last line data of either one of the two fields. It is known to those skilled in the art that 525 lines of data is the NTSC TV format and each field has 263 lines of data with the last line half used. When the write pointer reaches the end of the memory 508, namely the $263^{rd}$ line cell, the read pointer must be at the $173^{rd}$ line cell, which is derived from the equation:

$$\frac{(525-9)}{1.5} \equiv 344;$$

half of which gives the previous location of the read pointer. At this particular moment, the memory 508 as referenced by 508 has all the odd field data written by the write pointer, namely the first field of TV data has been stored in the memory 508. To reuse the memory, the write pointer is advanced circularly, back to the first line cell of the memory and continues to advance for writing new lines of data, even field data this time, into the memory while the read pointer continues advancing downward according to FIG. 5 to read out the stored odd field data. When the read pointer reaches the last line cell 263, namely finished reading out of the stored odd field data, the write pointer writing the even field data has reached at the line cell 135 of the memory referenced by 512 in FIG. 5. The memory portion, or the line cells, referenced by 514 now has the even field data and the line cells referenced by 515 still has the odd field data that have been read out and therefore become available for the write pointer to continue writing the even file data therein. Again the read pointer is advanced circularly, back to the first line cell of the memory and continues to advance for reading out the stored even field data in the memory. When the read pointer reaches line cell 85, the write pointer again reaches the last line 263, which ends the even or the $2^{nd}$ field data writing as referenced by 516 in FIG. 5. The writing and reading processes are performed in blocks 414, 416, 418 and 420 in FIG. 4, namely the write pointer and the read pointer advance, circularly and independently, at the pace of the source refresh rate $R_{source}$ and the target refresh rate the source rate $R_{target}$, respectively.

As in this case, the write pointer advances circularly faster than the read pointer, the write pointer will eventually catch up with the read pointer. To ensure that the read pointer always follows the write pointer for reading out valid video data, block 422 is provided to examine constantly the address difference between the write pointer and the read pointer. If the detection at 422 indicates that the address difference is less than a threshold, namely only a few line cells away, an action of pausing the write pointer for a source frame time is needed. Block 424 sends a signal to the control circuit 8 of FIG. 3 to stop the write pointer advancement and resume the advancement thereof right after one source frame time. It can be more appreciated to refer to FIG. 5 again wherein four difference memory status are referenced by 520, 524, 528 and 532. Following the memory status referenced by 516, the write pointer advances circularly and soon catches the read pointer as the write pointer advances 1.5 times faster than the read pointer. According to 422, the address difference therebetween becomes less than the predefined threshold, the write pointer must be stopped for a source frame time, i.e. $1/R_{source}$ second, and the read pointer continues advancing circularly. After one source frame time, the write pointer is reactivated and advances again. It can be understood that the read pointer would never surpass the write pointer while the write pointer is paused, this is guaranteed by the fact that the source video frame time is shorter than the TV frame time. Referenced by 520, the memory has the top part filled with odd field data and the bottom part 523 filled with a previous even field data for the read pointer to continue reading the data therefrom. Memory 524 shows that the write pointer is being paused and only the read pointer is advancing. The memory referenced by 528 shows that the read pointer has advanced circularly back to the top part of the memory of which the portion 530 has been accessed by the read pointer. As soon as the read pointer reaches the line cell 166, the write pointer resumes its advancement and begin again writing the previous unfinished odd field data into the memory portion refereed by 531. The memory status 532 shows that the write pointer finishes the writing of the odd field data and the position of the read pointer.

In explaining the memory status, the memory size is assumed to hold exactly one field data. It is by now understood to those skilled in the art that the memory size can actually be much reduced without departing from the scope of the illustration in FIG. 5. As all the pointers are advancing circularly and data are being written into the memory circularly as well, a portion of the memory can be saved as long as the two pointers are timed to never collide, namely the read pointer shall never advance ahead of the write pointer. The minimum required memory of the design could be calculated as follows:

Int((VWF/MRL)+2)

wherein Int( ) is an integer operator meaning, for example, Int(23.344)=23 and the numeral 2 is added for extra tolerance, VWF is the time it takes to write a frame of source image and evaluated as $1/R_{source}$, and MRL is the time it takes to read a line from the memory to form the target data and evaluated as 1/(H.Sync*Vertical Lines). For example, for NTSC 640 Mode 4, the following parameters are provided:

$R_{source}$=85.008 Hz;

H. Sync=59.94 Hz;

Vertical Lines=262.5

Therefore, VWF=1/85.008=11763.60 microsecond, and MRL=1/(59.94*262.5)=63.55 microsecond, which results in the minimum required memory=(11763.60/63.55)+2=187 line cells versus regular (262.5×2)=525 line cells.

Second Case D<0

The second case is that $R_{source}$ is smaller than $R_{target}$. Similarly to the first case, it is preferable to let the write pointer advance for enough lines to ensure that read pointer always points to a line cell that holds valid video data. That means the read pointer shall always follow the write pointer. A care must be taken to look after the initial write pointer, preferably permitting the write pointer to advance to the last line cell of the memory in use since the read pointer now advances fast than the write pointer does and will eventually catches the write pointer. Having the write pointer advance to the last line of the memory leaves, in principle, the largest pointer gap between the two pointers. In blocks 430 and 432, the write pointer points to one line cell and a sequence of the video data is written therein, then the write pointer advances to the next line cell and a second sequence of the video data is written therein. After the write pointer reaches the last line cell, the read pointer starts to activate, starting reading data from the $1^{st}$ line cell forward that has been accessed by the write pointer. In other words, the disclosed system starts to send out synchronized video data in block 434 although the write pointer continues to advance at the pace of the source refresh rate $R_{source}$ in blocks 436 and 438. FIG. 6 illustrates graphically corresponding contents in the memory, respectively, with respect to the positions of the write and read pointers and each of the contents can be viewed as a memory status at an instantaneous moment. Referenced by 602, the memory has been filled with all odd field data by the write pointer which is now at the very last line cell of the memory 602 and the read pointer is still initialized at the first line cell of the memory 602. It is provided that the memory is large enough to hold the entire first field data, namely the entire odd field data of the source video data. In blocks 436 and 438, the write pointer continues to advance and graphically goes back to the first line cell of the memory to continue writing source video data or even field data into the memory while the read pointer continues to advance to read out the stored odd field data and leave new line cells for new data to be written by the write pointer. Because the read pointer advances faster than the write pointer does, the write pointer points somewhere in the middle of the memory by the time the read pointer reaches the last line cell of the memory referenced by 604 in FIG. 6. The memory portion referenced by 606 contains a part of the even data of the source video data and the memory portion referenced by 608 shows the contents of the previous odd field data and the space thereof however becomes available line cells for writing new video data or the current even field data therein. As in block 434 and 440, the read pointer continues to advance circularly to read out stored even field data from the memory in blocks 434 and 440 while the write pointer advances circularly to continue writing now odd field data of the source video data into the memory as referenced by 610. The memory status 610 shows that the top portion 612 now holds odd field data and the bottom portion 614 hold the previous even field data. The memory status 610 also shows graphically that the write pointer appears slightly behind comparing to its corresponding position in memory status 604. This difference is due to the fact that the read pointer advances faster than the write pointer. In other words, every time the read pointer reaches the end of the memory, the write pointer resides more upwards. After one more fields of the data are written into the memory 616, the write pointer is even more behind. To view from the perspective of the read pointer, the write pointer is getting closer to the read pointer that is behind it. At certain point, the read pointer would catch up with the write pointer and start accessing the data that have been accessed in a previous field and are invalid. To prevent the read pointer from reading invalid data, block 442 constantly examining the address difference between the pointers and will immediately initialize a second write pointer if the address difference becomes less than a threshold T2 through the control circuit 8. The threshold T2 is to ensure that the two pointers would not collide in the current field, practically T2 being 35 lines is good enough for currently commercially available video cards that has a video refresh rate slower than that of the NTSC TV standard and is large enough to guarantee the read point always behind the write pointer so as to read out valid video data. The so-called second write pointer as shown in the memory status 618 is a second address signal generated from the control circuit 8 and is only used in the case that the source refresh rate is slower than the target refresh rate. To effectively reuse the memory, the second write pointer is initialized in block 442 right behind the read pointer, as the memory portion 622 has become available for writing new data therein. The initialized position of the second write pointer provides the largest gap between the second write pointer and the read pointer so as to ensure that the read pointer would not surpass the second write pointer soon. The memory status 616 shows that the write pointer is writing even field data into the memory 616 and the read pointer reaches the end of the memory 616 and prepares to advance circularly. Now the memory status referenced by 618 shows that the read pointer has been closely following the write pointer to continue reading the even file data that the write pointer has not finished in the memory status referenced by 616. Block 442 detects that the difference between the two pointers is within the threshold T2, activating the second write pointer which starts writing the following odd field data into the memory as reflecting in blocks 446 and 448. Graphically the second writer pointer advances and writes new data into the line cell as it advances downward as shown in the memory status 618. With the introduction of the second write pointer, block 540, functioning similar to block 442, detects the address difference between the original write pointer and the read pointer. If the address difference is less than a threshold T3, say 1 or 2 lines, the address of the original write pointer is assigned to be that of the second write pointer which is discarded thereafter. Meanwhile the read pointer continues to advance for reading data from the line cells that were actually visited by the second write pointer which now has been discarded. The memory status 636 shows that the read pointer appears before the write pointer. As stated, the read pointer is now reading out data that were written by the second write pointer and has enough line cells to access as the write pointer which used to be the second write pointer is far ahead of the read pointer and continues to write odd field data into the memory. The memory status referenced by 640 illustrates that the read pointer has advanced circularly back to the beginning of the memory 640 and the write pointer continues to write the odd filed data in to the memory.

The present invention has been described in sufficient detail with one exemplary embodiment. Alternative embodiments will become apparent to those skilled in the art to which the present invention pertains without departing from its spirit and scope. Accordingly, the scope of the present invention is defined by the appended claims rather than the forgoing description of one embodiment.

What is claimed is:

1. A method for reducing video data memory in a signal converter for converting non-interlaced signals to interlaced signals with a refresh rate $R_{target}$, the signal converter comprising an input signal processing circuitry receiving the non-interlaced signals and producing source data with a refresh rate $R_{source}$, the source data comprising a plurality of lines, each of the lines comprising a plurality of pixels, the source data further comprising two fields of data, one field comprising all of the even lines of the source data and the other field comprising all of the odd lines of the source data; the method comprising the steps of:

(a) providing a memory comprising a plurality of line cells, each being accessible by a write pointer and a read pointer;

(b) providing a control circuitry generating at least a pair of address information to control the write pointer and the read pointer, individually, for accessing the line cells independently and respectively;

(c) receiving the lines of the source data sequentially;

(d) initializing the write pointer and the read pointer;

(e) writing one line of the source video data into one line cell of the memory; the line cell being addressed and pointed by the write pointer;

(f) advancing the write pointer at the speed of $R_{source}$;

(g) reading out the line of data stored in the line cell of the memory, the line cell being addressed and pointed by the read pointer;

(h) advancing the read pointer at the speed of $R_{target}$;

(i) comparing an address difference between the write pointer and the read pointer;

(j) repeating from the step (e) to the step (h) if the step (i) indicates that the read pointer follows the write pointer by at least T1 line cells of the memory.

2. The method as recited in claim 1, wherein each of the line cells of the memory comprises a plurality of pixel cells, each pixel cell storing a pixel of the source data and all of the pixel cells in one line cell being addressable by an addressing pointer.

3. The method as recited in claim 2, wherein the addressing pointer is the write pointer, one line data of the source data being written into one line cell of the memory when the write pointer points to the line cell.

4. The method as recited in claim 3, wherein the addressing pointer is the read pointer, the line data stored in the line cell being read out by the read pointer pointing at the line cell.

5. The method as recited in claim 4, wherein the control circuitry controls the write pointer and the read pointer individually and independently, and at the speed of $R_{source}$ and $R_{target}$, respectively.

6. The method as recited in claim 1, wherein the step (d) further comprises the steps of:

receiving an initialized address from the control circuitry for both the write pointer and the read pointer;

writing one line of the source data into one of the line cells of the memory; the line cell being pointed by the write pointer;

advancing the write pointer to the next line cell of the memory at the speed of $R_{source}$;

repeating the steps of writing one line of the source data into one of the line cells and advancing the write pointer to the next line cell of the memory at the speed of $R_{source}$ till the write pointer reaches a predefined position $W_b$; and invoking the read pointer sequentially to read out the lines of the source data stored by the write pointer in the memory.

7. The method as recited in claim 6, wherein the step of receiving the initialized address from the control circuitry for both the write pointer and the read pointer determines an initial address of one line cell of the memory for the write pointer to start therefrom at the speed of $R_{source}$.

8. The method as recited in claim 7, wherein the step of receiving an initialized address from the control circuitry for both the write pointer and the read pointer determines the initial address for the read pointer to start therefrom at the speed of $R_{target}$.

9. The method as recited in claim 1 wherein the step of advancing the write pointer comprises a step of jumping the write pointer to the beginning of the memory if the write pointer reaches the end of the memory.

10. The method as recited in claim 9 wherein the step of advancing the read pointer comprises a step of jumping the read pointer to the beginning of the memory if the read pointer reaches the end of the memory.

11. The method as recited in claim 1, prior to the step (e), further comprising the step of determining a refresh rate difference D between $R_{source}$ and $R_{target}$.

12. The method as recited in claim 11 wherein the step (d) comprises the steps of:

receiving an initialized address from the control circuitry for both the write pointer and the read pointer;

writing one line of the source data into one of the line cells of the memory; the line cell being pointed by the write pointer;

advancing the write pointer at the speed of $R_{source}$ to the next line cell of the memory;

repeating the steps of writing one line of the source data into one of the line cells and advancing the write pointer to the next line cell of the memory till the write pointer reaches a predefined position $W_b$ when the refresh rate difference D is equal to or greater than zero; and invoking the read pointer to read out sequentially the lines of the source data stored by the write pointer.

13. The method as recited in claim 12 further comprising the steps of:

(k) reading out the line of data stored in the line cell of the memory; the line cell being addressed and pointed by the read cell;

(l) advancing the read pointer circularly at the speed of $R_{target}$; and (m) comparing an address difference between the write pointer and the read pointer.

14. The method as recited in claim 13 further comprising the steps of:
(n) generating a write control signal when the address difference is less than a first threshold;
(o) holding the write pointer for a period of $1/R_{source}$ upon receiving the write control signal; and
(p) repeating the steps from (k) to (o) till the source video data is no longer received.

15. The method as recited in claim 12 wherein the step (d) comprises the step of:
receiving an initialized address from the control circuitry for both the write pointer and the read pointer;
writing one line of the source data into one of the line cells of the memory; the line cell being pointed by the write pointer;
advancing the write pointer at the speed of $R_{source}$ to the next line cell of the memory;
repeating the steps of writing one line of the source data into one of the line cells and advancing the write pointer at the speed of $R_{source}$ to the next line cell of the memory till the write pointer reaches a line cell that has the largest separation from the initialized read pointer when the refresh rate difference D is less than zero; and
invoking the read pointer to read out sequentially the lines of the source data stored by the write pointer.

16. The method as recited in claim 15, wherein the line cell that has the largest separation from the initialized read pointer is the last line cell of the memory while the read pointer is initialized at the first line cell of the memory.

17. The method as recited in claim 16 further comprising the steps of:
writing a line of the source video data into a line of the memory; the line cell being addressed and pointed by the write pointer;
advancing the write pointer at the speed of $R_{source}$;
reading out the line of data stored in the line cell of the memory, the line cell being addressed and pointed by the read cell;
advancing the read pointer at the speed of $R_{target}$; and
comparing an address difference between the write pointer and the read pointer.

18. The method as recited in claim 17 further comprising the steps of:
generating a write control signal when the address difference is less than a second threshold;
initializing a second write pointer right behind the read pointer;
writing one line of the source video data into one line of the memory; the line cell being addressed and pointed by the second write pointer; advancing the write pointer and the second write pointer at the speed of $R_{source}$;
reading out the line of data stored by the write pointer in the line cell of the memory, the line cell being addressed and pointed by the read cell;
advancing the read pointer at the speed of $R_{target}$; and
comparing an address difference between the write pointer and the read pointer.

19. The method as recited in claim 18 further comprising the steps of assigning the write pointer to the second write pointer when the address difference between the write pointer and the read pointer becomes less than a third threshold.

20. An apparatus for reducing video data memory in a signal converter for converting non-interlaced signals to interlaced signals with a refresh rate $R_{target}$, the signal converter comprising an input signal processing circuitry receiving the non-interlaced signals and producing source data with a refresh rate $R_{source}$, the source data comprising a plurality of lines, each of the lines comprising a plurality of pixels, the source data further comprising two fields of data, one field comprising all of the even lines of the source data and the other field comprising all of the odd lines of the source data; the apparatus comprising:
a memory comprising a plurality of line cells, each being accessible by a write pointer and a read pointer independently and respectively;
a control circuitry generating at least a pair of address information to control the write pointer and the read pointer, individually, for accessing the line cells of the memory independently and respectively;
means for receiving the lines of the source data sequentially;
means for initializing the write pointer and the read pointer;
means for writing one line of the source video data into one line cell of the memory, the line cell being addressed and pointed by the write pointer;
means for advancing the write pointer at the speed of $R_{source}$;
means for reading out the line of data stored in the line cell of the memory, the line cell being addressed and pointed by the read pointer;
means for advancing the read pointer at the speed of $R_{target}$; and
means for determining an address difference between the write pointer and the read pointer.

21. The apparatus as recited in claim 20, wherein each of the line cells of the memory comprises a plurality of pixel cells, each pixel cell storing a pixel of the source data and all of the pixel cells in a line cell being addressable by an addressing pointer.

22. The apparatus as recited in claim 21, wherein the addressing pointer is the write pointer, one line data of the source data being written into one line cell of the memory when the write pointer points to the line cell.

23. The apparatus as recited in claim 22, wherein the addressing pointer is the read pointer, the line data stored in the line cell being read out by the read pointer pointing at the line cell.

24. The apparatus as recited in claim 23, wherein the control circuitry controls the write pointer and the read pointer individually and independently, and at the speed of $R_{source}$ and $R_{target}$, respectively.

25. The apparatus as recited in claim 20, wherein the means for initializing the write pointer and the read pointer comprises:
means for receiving an initialized address from the control circuitry for both the write pointer and the read pointer;
means for writing one line of the source data into one of the line cells of the memory; the line cell being pointed by the write pointer;
means for advancing the write pointer to the next line cell of the memory at the speed of $R_{source}$; and
means for invoking the read pointer to read out the lines of the source data stored by the write pointer when the write pointer reaches a predefined position $W_b$.

26. The apparatus as recited in claim 25, wherein the means for receiving the initialized address from the control circuitry for both the write pointer and the read pointer determines an initial address of one line cell of the memory for the write pointer to start therefrom at the speed of $R_{source}$.

27. The apparatus as recited in claim 26, wherein the means for receiving the initialized address from the control circuitry for both the write pointer and the read pointer determines the initial address for the read pointer to start therefrom at a pace of a target refresh rate $R_{target}$.

28. The apparatus as recited in claim 20 wherein the means for advancing the write pointer comprises means for jumping the write pointer to the beginning of the memory if the write pointer reaches the end of the memory.

29. The apparatus as recited in claim 20 wherein the means for advancing the read pointer comprises means for jumping the read pointer to the beginning of the memory if the read pointer reaches the end of the memory.

30. The apparatus as recited in claim 20, further comprising means for determining a refresh rate difference D between $R_{source}$ and $R_{target}$.

31. The apparatus as recited in claim 30 wherein the means for initializing the write pointer and the read pointer comprises:

means for receiving an initialized address from the control circuitry for both the write pointer and the read pointer;

means for writing one line of the source data into one of the line cells of the memory; the line cell being pointed by the write pointer;

means for advancing the write pointer at the speed of $R_{source}$ to the next line cell of the memory; and means for invoking the read pointer to read out the lines of the source data stored by the write pointer.

32. The apparatus as recited in claim 31 further comprising:

means for reading out the line of the source data stored in the line cell of the memory; the line cell being addressed and pointed by the read cell;

means for advancing the read pointer circularly at the speed of $R_{target}$; and means for determining an address difference between the write pointer and the read pointer.

33. The apparatus as recited in claim 32 further comprising:

means for generating a write control signal when the address difference is less than a first threshold; and means for holding the write pointer for a period of $1/R_{source}$ upon receiving the write control signal.

34. The apparatus as recited in claim 30 wherein the means for initializing the write pointer and the read pointer comprises:

means for receiving an initialized address from the control circuitry for both the write pointer and the read pointer;

means for writing lines of the source data into the respective line cells of the memory; the writing means further comprising means for advancing the write pointer at the speed of $R_{source}$ to the next line cell of the memory till a line cell that has a largest separation from the initialized read pointer; and means for invoking the read pointer to read out the lines of the source data stored by the read pointer.

35. The apparatus as recited in claim 34, wherein the line cell that has the largest separation from the initialized read pointer is the last line cell of the memory when the read pointer is initialized at the first line cell of the memory.

36. The apparatus as recited in claim 35 further comprising:

means for reading out the line of data stored in the line cell of the memory, the line cell being addressed and pointed by the read pointer;

means for advancing the read pointer at the speed of $R_{target}$; and means for determining an address difference between the write pointer and the read pointer.

37. The apparatus as recited in claim 36 further comprising:

means for generating a write control signal when the address difference is less than a second threshold;

means for initializing a second write pointer right behind the read pointer;

means for writing one line of the source video data into one line of the memory; the line cell being addressed and pointed by the second write pointer;

means for advancing the write pointer and the second write pointer at the speed of $R_{source}$;

means for reading out the line of data stored by the write pointer in the line cell of the memory, the line cell being addressed and pointed by the read pointer;

means for advancing the read pointer at the speed of $R_{target}$; and means for assigning the write pointer to the second write pointer when the address difference between the write pointer and the read pointer becomes less than a third threshold.

38. A method for reducing video data memory in a signal converter for converting non-interlaced signals to interlaced signals with a refresh rate $R_{target}$, the signal converter comprising an input signal processing circuitry receiving the non-interlaced signals and producing source data with a refresh rate $R_{source}$, the source data comprising a plurality of lines, each of the lines comprising a plurality of pixels, the source data further comprising two fields of data, one field comprising all of the even lines of the source data and the other field comprising all of the odd lines of the source data; the method comprising the steps of:

(a) providing a memory comprising a plurality of line cells, each of the line cells comprising a plurality of pixel cells and each of the pixel cells storing one pixel of the source data; each of the line cells being accessible by a write pointer and a read pointer, independently and respectively; one line of pixels being written into one line cell of the memory when the line cell is pointed by the write pointer; the line of pixels stored in the line cell being read out when the line cell is pointed by the read pointer;

(b) providing a control circuitry generating at least a pair of address information to control the write pointer and the read pointer, individually, for accessing the line cells independently and respectively;

(c) receiving lines of the source data sequentially;

(d) determining a refresh rate difference D between $R_{source}$ and $R_{target}$;

(e) initializing the write pointer and the read pointer;

(f) writing one line of the source video data into one line cell of the memory; the line cell being addressed and pointed by the write pointer;

(g) advancing the write pointer at the speed of $R_{source}$;

(h) reading out the line of data stored in the line cell of the memory, the line cell being addressed and pointed by the read pointer;

(i) advancing the read pointer at the speed of $R_{target}$ when the write pointer reaches a predefined line cell of the memory; and (j) comparing an address difference between the write pointer and the read pointer.

39. The method as recited in claim 38, further comprising the steps of:
- (k) pausing the write pointer for a period of $1/R_{source}$ when $D \geq 0$ and the comparison at step (j) indicates that the address difference is less than a threshold $T_1$; and
- (l) repeating the steps from (f) to (k) till the source video data is no longer received.

40. The method as recited in claim 38, further comprising the steps of:
- (m) initializing a second write pointer right behind the read pointer when $D<0$ and the comparison at step (j) indicates that the address difference is less than a threshold $T_2$;
- (n) writing each of the lines in one field of the source video data into each of the line cells of the memory; each of the line cells being addressed and pointed by the second write pointer;
- (o) writing each of the lines in the other field of the source video data into each of the line cells of the memory; each of the line cells being addressed and pointed by the original write pointer;
- (p) advancing the original write pointer and the second write pointer at the speed of $R_{source}$;
- (q) reading out the lines of data stored by the original write pointer in the line cells of the memory, the line cell being addressed and pointed by the read pointer;
- (r) advancing the read pointer at the speed of $R_{target}$;
- (s) comparing a second address difference between the write pointer and the read pointer; and
- (t) assigning the original write pointer to the second write pointer when the comparison at step (s) indicates that the second address difference is less than a third threshold $T_3$.

41. An apparatus for reducing video data memory in a signal converter for converting non-interlaced signals to interlaced signals with a refresh rate $R_{target}$, the signal converter comprising an input signal processing circuitry receiving the non-interlaced signals and producing source data with a refresh rate $R_{source}$, the source data comprising a plurality of lines, each of the lines comprising a plurality of pixels, the source data further comprising two fields of data, one field comprising all of the even lines of the source data and the other filed comprising all of the odd lines of the source data; the apparatus comprising:

means for providing a memory comprising a plurality of line cells, each of the line cells comprising a plurality of pixel cells and each of the pixel cells storing one pixel of the source data; each of the line cells being accessible by a write pointer and a read pointer, independently and respectively; one line of pixels being written into one line cell of the memory when the line cell is pointed by the write pointer; the line of pixels stored in the line cell being read out when the line cell is pointed by the read pointer;

means for providing a control circuitry generating at least a pair of address information to control the write pointer and the read pointer, individually, for accessing the line cells independently and respectively;

means for receiving lines of the source data sequentially;

means for determining a refresh rate difference D between $R_{source}$ and $R_{target}$.

means for initializing the write pointer and the read pointer;

means for writing one line of the source video data into one line cell of the memory; the line cell being addressed and pointed by the write pointer;

means for advancing the write pointer at the speed of $R_{source}$;

means for reading out the line of data stored in the line cell of the memory, the line cell being addressed and pointed by the read pointer;

means for advancing the read pointer at the speed of $R_{target}$ when the write pointer reaches a predefined line cell of the memory; and means for comparing an address difference between the write pointer and the read pointer.

42. The apparatus as recited in claim 41 further comprising means for pausing the write pointer for a period of $1/R_{source}$ when $D \geq 0$ and the address difference is less than a threshold $T_1$.

43. The apparatus as recited in claim 41, further comprising:

means for initializing a second write pointer right behind the read pointer when $D<0$ and the address difference is less than a threshold $T_2$;

means for writing each of the lines in one field of the source video data into each of the line cells of the memory; each of the line cells being addressed and pointed by the second write pointer;

means writing each of the lines in the other field of the source video data into each of the line cells of the memory; each of the line cells being addressed and pointed by the original write pointer;

means for advancing the original write pointer and the second write pointer at the speed of $R_{source}$;

means for reading out the lines of data stored by the original write pointer in the line cells of the memory, the line cell being addressed and pointed by the read pointer;

means for advancing the read pointer at the speed of $R_{target}$;

mans for comparing a second address difference between the write pointer and the read pointer; and means for assigning the original write pointer to the second write pointer when the second address difference is less than a third threshold $T_3$.

* * * * *